United States Patent [19]

Gaudfrin

[11] Patent Number: 4,569,762

[45] Date of Patent: Feb. 11, 1986

[54] BELT FILTER EQUIPPED WITH AN AIR SUCTION DEVICE

[76] Inventor: Guy Gaudfrin, 6, Allée du Bec de Canard, Golfe de Saint-Nom-la-Bretèche, 78860 Saint-Nom-la-Breteche, France

[21] Appl. No.: 575,985

[22] Filed: Feb. 1, 1984

[30] Foreign Application Priority Data

Feb. 4, 1983 [FR] France .............................. 83 01804

[51] Int. Cl.[4] .............................................. B01D 33/04
[52] U.S. Cl. .................................. 210/401; 210/406; 210/416.1
[58] Field of Search ............... 210/400, 401, 406, 783, 210/160, 416.1, 231, 473, 474, 484, 386; 162/349

[56] References Cited

U.S. PATENT DOCUMENTS

| | | | |
|---|---|---|---|
| 2,237,635 | 4/1941 | Saxe | 210/400 |
| 2,528,642 | 11/1950 | Cover | 210/406 |
| 3,677,411 | 7/1972 | Ishigaki | 210/401 |
| 4,037,338 | 7/1977 | Berline | 210/401 |
| 4,137,062 | 1/1979 | Mullerheim et al. | 210/401 |

Primary Examiner—David L. Lacey
Attorney, Agent, or Firm—Lewis H. Eslinger

[57] ABSTRACT

Improved belt filter in which the belt comprises transverse channels provided with draining holes issuing into a draining trough. The end of a suction pipe connected with a vacuum-creating device, issues into the upper part of said trough.

3 Claims, 5 Drawing Figures

BELT FILTER EQUIPPED WITH AN AIR SUCTION DEVICE

The present invention relates to belt filters equipped with an air suction device.

Different types of belt filters are already known particularly for extracting a liquor from a suspension. Such filters generally consist of an endless carrier belt whose upper surface is provided with transverse channels defined by substantially parallel transverse ribs. The belt is driven in uniform manner by any appropriate means and its displacement is such that its upper surface remains substantially horizontal.

When the belt is in movement, the upper surface crest of the transverse ribs comes into contact with a filtering fabric or the like, moving in agreement with the belt. The transverse channels are thus covered by the filtering fabric and the suspension to be filtered is brought to the resulting filter assembly by any appropriate means.

Draining holes are formed at the bottom of the transverse channels and a draining trough is provided under the upper side of the belt to collect the filtered liquor and to carry it through its channeling system towards receiver balloons. The filtered liquor however carries away a certain quantity of air of various origins, and for this reason, means of connection to a vacuum-creating device permitting to suck in the aforesaid air, are provided in the upper region of the receiver balloon.

The filters of the aforementioned known type present certain disadvantages. First of all, the filtered liquor draining system is required to transport a large quantity of air and their dimensions, as a result, are large. Secondly, the power of the vacuum-creating device has to be very high and despite all the precautions taken, it is found that the filtration through the filtering cake is achieved in bad conditions especially at the downstream end of the upper side of the carrier belt. As a result, the filter output remains low despite a methodical filtration conducted against the flow, and what is more, said output may vary during use.

It is the object of the present invention to propose a belt filter of the afore-described type, but comprising a number of improvements designed to overcome the aforesaid disadvantages.

According to one essential characteristic of the invention an endless carrier belt is provided with transverse channels formed by a plurality of substantially parallel transverse ribs, at least one air suction pipe connects the upper region of the draining trough with a vacuum-creating device, the end of said suction pipe inside the trough being situated close to the lower face of the upper side of the carrier belt, wherein selected ones of the transverse ribs are formed having ventilation holes that communicate with at least one adjacent transverse channel by passages formed in the crest of each of such selected ribs.

Due to this arrangement, the lower face of the filter medium in contact with the carrier belt is directly subjected to the vacuum, this improving the drainage of the filtered liquor and in particular the uniformity of the filtration everywhere along the belt. In addition, the air carried by the filtered liquor through the air ventilating holes of the carrier belt is picked up in the upper region of the trough so that only air-free liquor flows through the draining channels, which latter can, as a result, have relatively small dimensions; and moreover, receiver balloons are no longer necessary.

The invention will be more readily understood on reading the following description with reference to the accompanying drawings, in which.

Figure 1:
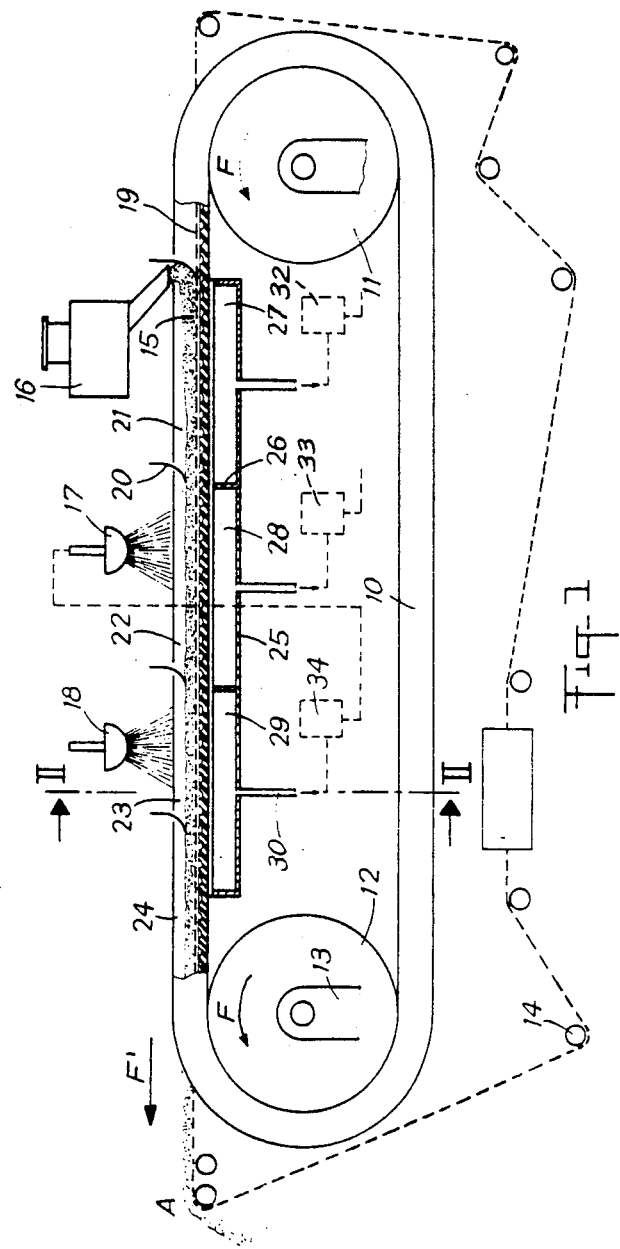
FIG. 1 is an elevational view of a diagrammatical longitudinal section of an endless belt according to the invention.

Referring first to FIG. 1, this shows that the filter comprises an endless belt 10 wound around two drums 11 and 12, one of which drums is driven in the direction of arrow F. Said drums are mounted on a chassis 13, only partly shown in the drawings; one of the drums may be moved to adjust the tension of the belt.

The endless belt 10, in natural or synthetic elastomer, has an upper side which is horizontal and designed to be covered up by a liquid-permeable filtering fabric 19 or the like, said fabric being moved in the direction F' followed by the endless belt. Fabric 19 is supported by support, guiding and tension rollers 14, in its displacement from the downstream end of the belt upper side to zone A where the cake is removed, and on its return trip on said upper side.

The suspension 15 to be filtered is poured from a supplier 16, distributors 17 and 18 being provided after said supplier on the path followed by the belt 10.

The surface above the fabric 19 is divided by a plurality of cross-members 20 into an extraction zone 21 below the supplier 16, and one or more washing zones 22 and 23 below distributors 17 and 18, and finally one draining zone 24.

The washing liquid fed to the divider-distributor 18 produces, when traversing zone 23, a washing filtrate which is fed to the distributor 17 of zone 22, thus performing a washing operation against the flow. It would of course be equally possible to use the same method with more than two washing zones.

Figure 2:
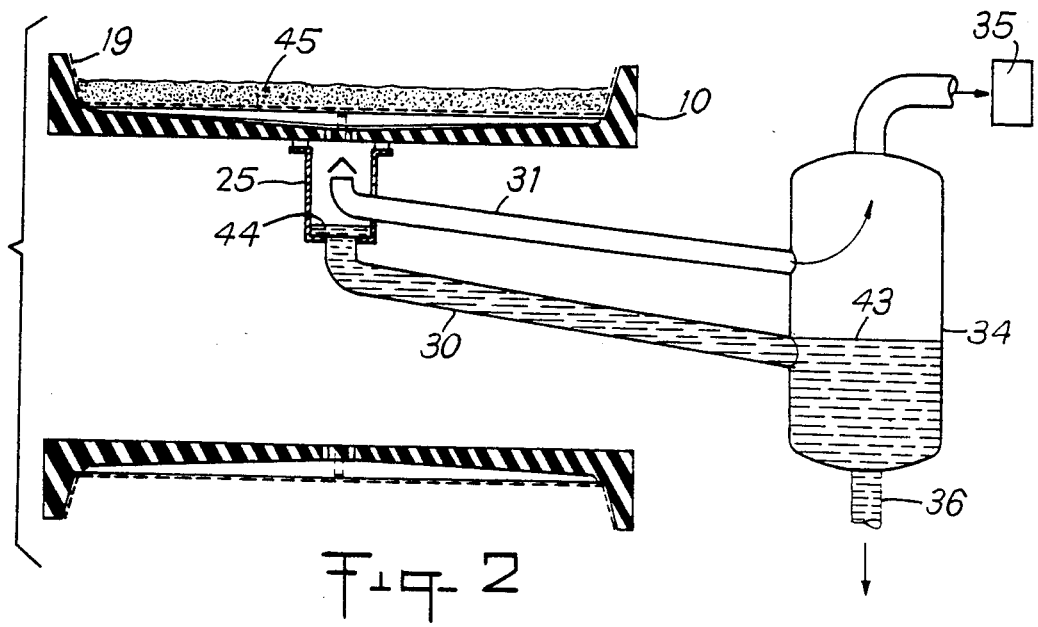
FIG. 2 is a cross-section along line II—II of FIG. 1.
Figure 4:
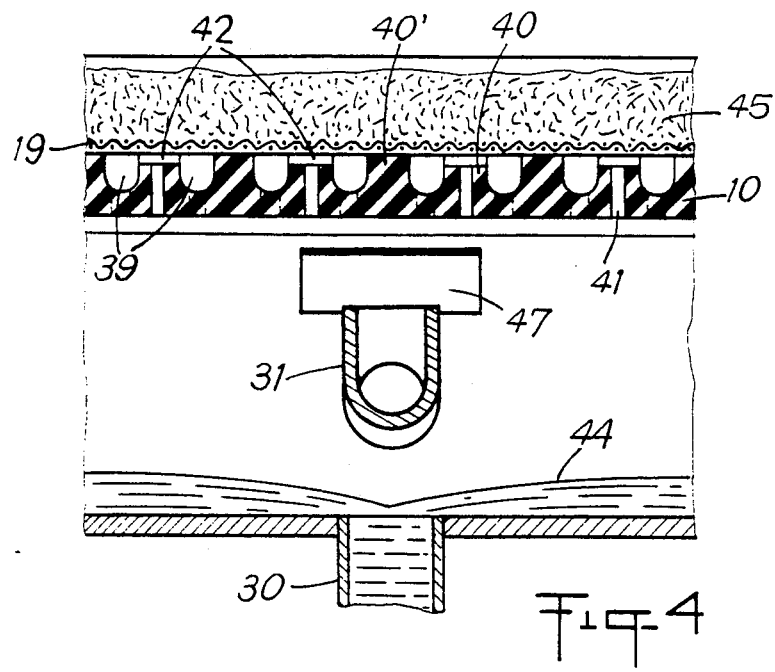
FIG. 4 is a cross-section along line III—III of FIG. 3.
Figure 3:
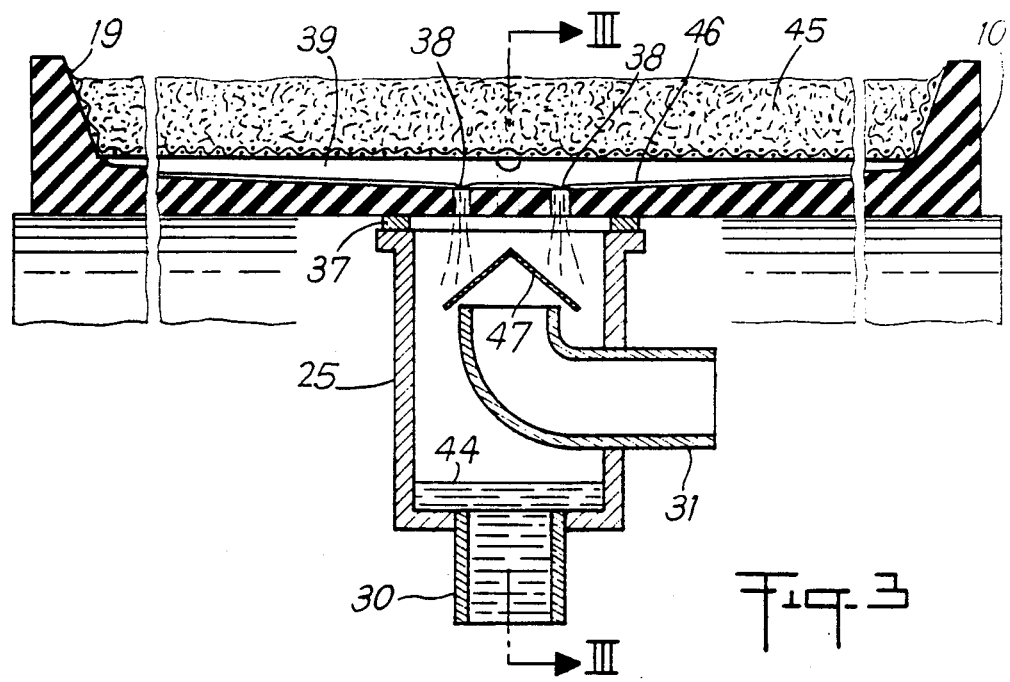
FIG. 3 is a cross-sectional view of part of FIG. 1, similar to FIG. 2 but on a larger scale.

A trough 25, open at its upper part, and more particularly illustrated in FIGS. 2, 3 and 4, is situated in the center of the underneath of the upper side of belt 10 and is divided internally by cross partitions 26 into three compartments 27, 28, 29 emptying respectively through draining channels 30 into receiver balloons 32, 33 and 34. In addition to the filtered liquor draining channels 30, the filter according to the invention is equipped with air suction pipes 31, the function of which will be explained hereinafter. Said pipes connect the upper part of the trough 25, inside each compartment 27, 28, 29, with the upper part of each balloon 32, 33, 34 respectively. Preferably, and as illustrated in FIG. 2, the said suction pipes are inclined to some extent, and their end on the balloon side, is so situated as to be always above the free level of the liquid in said balloons, regardless of the conditions of operation. Said pipes are thus permanently in direct communication, without any loss of load, with the vacuum-creating device 35 which is about to be described.

The upper part of the receiver balloons 32, 33, 34 is indeed connected to a vacuum-creating device diagrammatically illustrated in 35, the filtered liquor being removed through a lower tube 36. There is virtually no dilution noted in the filtered liquor extracted from zone 21 through balloon 32, whereas a gradually increasing dilution is noted in the filtered liquor extracted from zones 22 and 23 through balloons 33 and 34 respectively.

Trough 25, adequately supported under the upper side of belt 10, is provided on the edges of its top opening, with anti-friction strips in Teflon or any other suitable material 37, said strips contacting with the surface of the belt as illustrated in FIG. 3.

Draining holes 38 issue between said strips 37, said holes forming two longitudinal rows, as illustrated in FIG. 3, and being made in the bottom of transverse channels 39 formed on the outer face of the belt. As can be seen in the Figures, said channels are covered with fabric 19 through the length of the upper side of the belt.

Transverse channels 39 are separated by ribs 40, 40' over which rest the fabric as shown in FIG. 4. Every other rib 40 is perforated to form a ventilating hole 41 issuing onto the inside face of the belt 10 and into trough 25. Horizontal passages 42 made in the crests of ribs 40, on the other hand, connects the volume of the transverse channels with that of the holes 41, and via said holes, with the trough 25.

The non-perforated intermediate ribs 40' on the contrary, prevent any longitudinal air flow along the belt 10.

Each compartment 27, 28, 29 of the trough 25 receives the extracted liquors flowing through the rows of draining holes 38 from the channels 39 and directs them towards the receiver balloon 32, 33, 34 respectively, via channels 30. Any air penetrating into the trough 25 via the cake 45, as well as any gas or vapor which may form through degassing or self-evaporation due to reduced pressure, are removed through suction pipes 31.

Thus, the compartments 27, 28, 29 of the trough 25 are parmanently filled with air, gas or vapor to balance the partial vacuum created by device 35 above the level 44 of the extracted liquor flowing at the bottom of every compartment. Moreover, there is always a possibility of draining out transverse channels 39 through ventilation holes 41 and passages 42, if the level of the liquid in said channels raises abnormally. Also, when a heavy flow of air goes through the cake 45 and penetrates into the channel 39, said flow can flow out through ventilation holes 41.

Owing to these special dispositions, only the liquid goes through draining holes 38 of channels 39, whereas the air flows in or out through ventilation holes 41.

Channels 39 are thus kept nearly empty, which, on the one hand, eliminates the harmful effect which the transfer of liquor between the different zones has on the output of the washing-against-the-flow operation, and on the other hand, keeps the loss of load in each channel 39 and in the draining holes 38 to a minimum.

Preferably, the mouth of the suction pipes 31 opening into the trough 25 is situated under draining holes 38 as shown in FIGS. 3 and 4 and a deflector 47 prevents the liquor from flowing into said opening.

Figure 5:
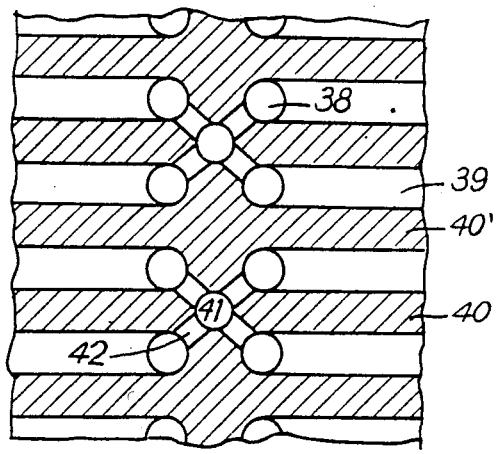
FIG. 5 is a plan view of the center part of the endless belt according to one advantageous variant.

FIG. 5 illustrates a variant embodiment in which the transverse channels 39 are in two separate parts. The same ventilation holes 31 communicating at the top with the channels 39 via horizontal passages 42 formed at the crest of the rib 40, are also provided in this variant. The filter works in the same way as that described hereinabove, but the advantage offered by this variant it that the ventilation holes 41 may have a diameter at least equal to the width of ribs 40.

What I claim is:

1. A filter for extracting a liquid from a suspension, of the type comprising an endless carrier belt whose upper surface is provided with transverse channels formed by a plurality of substantially parallel transverse ribs, the upper side of the belt being substantially horizontal and covered with a filtering fabric in contact with said ribs for receiving the suspension, whereas draining holes are provided in the bottom of said transverse channels of the belt and a draining trough is provided under the lower face of said belt upper side and liquid draining pipes are provided at the bottom of said draining trough, wherein selected ones of said plurality of transverse ribs are formed having at least one ventilation hole communicating with at least one adjacent transverse channel by passages formed in a crest of each of said selected ribs.

2. A filter as claimed in claim 1, wherein the transverse channels of the belt are in two separate parts, each part having its own draining hole, whereas the ventilation holes have a diameter at least equal to a width of the transverse ribs forming the channels.

3. A filter as claimed in claim 1, wherein the draining trough comprises, in addition to the liquid draining pipes provided at the bottom of said trough, an air suction pipe connecting the upper part of said draining trough with a vacuum-creating device, an end of said air suction pipe being arranged at a point close to the lower face of the carrier belt upper side.

* * * * *